A. T. Wright,
Bee Hive.

No. 85,716.   Patented Jan. 5, 1869.

Witnesses:
Harry King
Leopold Evert

Inventor:
A. T. Wright
Per Alexander V. Mason
Attys.

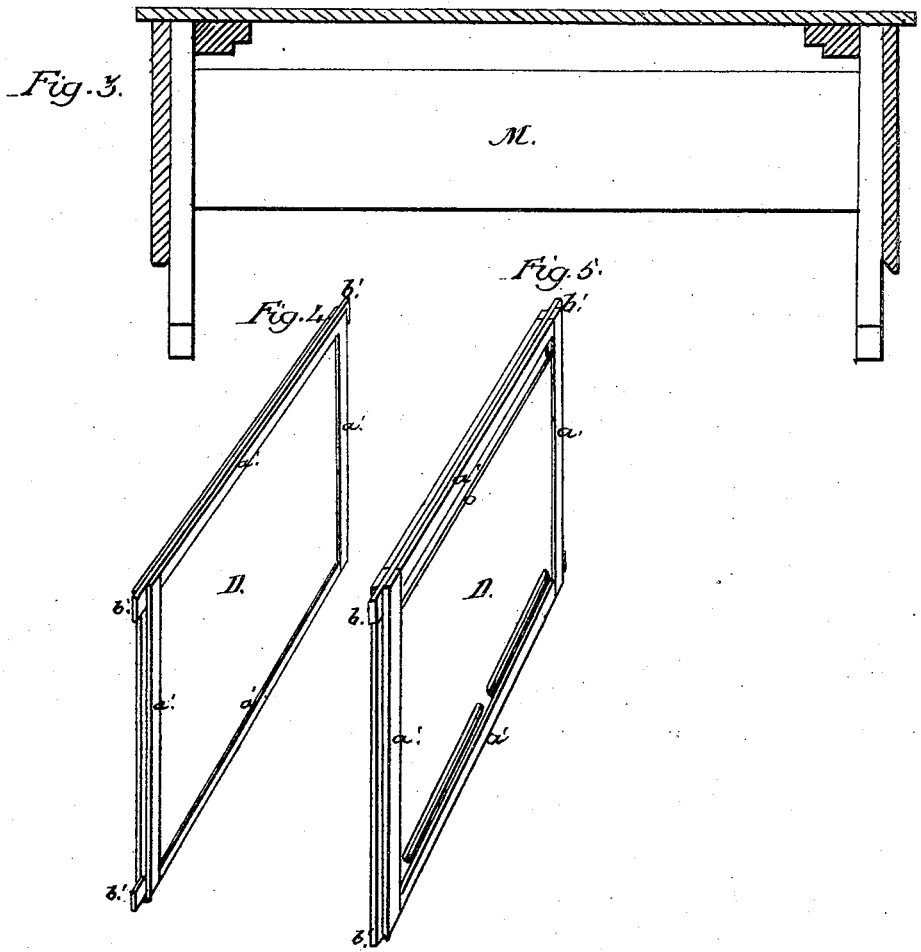

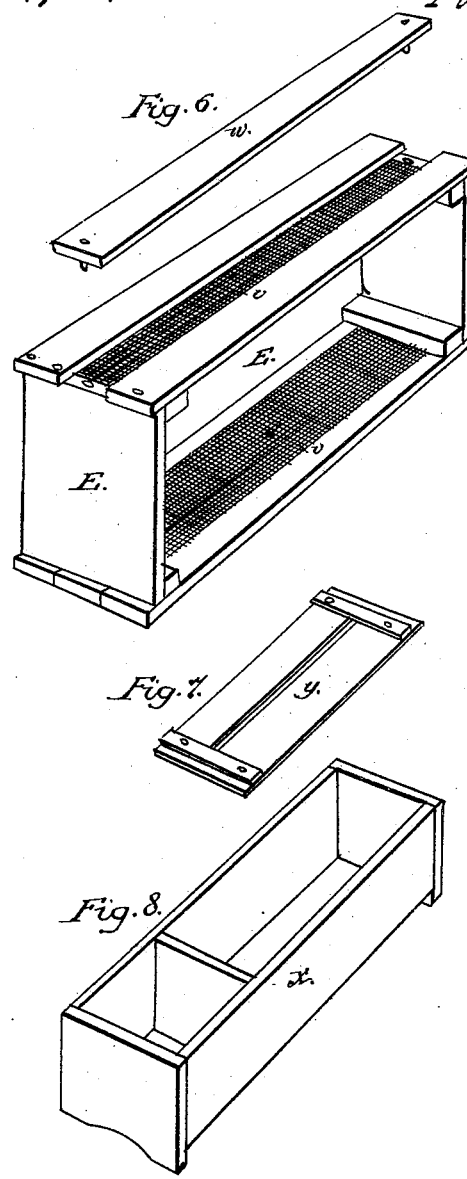

United States Patent Office.

A. T. WRIGHT, OF NEW VIENNA, OHIO.

Letters Patent No. 85,716, dated January 5, 1869.

IMPROVEMENT IN BEE-HIVES.

The Schedule referred to in these Letters Patent and making part of the same.

*To all whom it may concern:*

Be it known that I, A. T. WRIGHT, of New Vienna, in the county of Clinton, and in the State of Ohio, have invented certain new and useful Improvements in "Bee-Hives;" and do hereby declare that the following is a full, clear, and exact description thereof, reference being had to the accompanying drawings, and to the letters of reference marked thereon.

The hereinafter-described bee-hive is intended as an improvement upon my patent of June 4, 1867, and consists, first, in the comb-frames as constructed, being united by the ropes and twisting-pins; second, in the removable strip $b'$, on the top of the comb-frames; third, in the combination of the end pieces F, strip $m$, space $k$, and reversible block $n$, to allow the bees to pass from the hive to the honey-boxes, and to and from the hive itself, the movable strip $m$ and reversible block regulating the passages, as set forth; fourth, in the removable pieces $b$ in the comb-guides $D'$, having openings at the top and bottom; and fifth, in the general construction and arrangement of the parts above specified.

I do not claim connecting the parts of the hive by wedges and clamps, as shown in my patent above referred to; nor do I claim the dividing-boards, with strips around their edges, as also seen in my former patent; nor do I claim dividing-boards with similar strips.

In order to enable others skilled in the art to make and use my invention, I will now proceed to describe its construction and operation, referring to the annexed drawings, which form a part of this specification, and in which—

Figure 1:
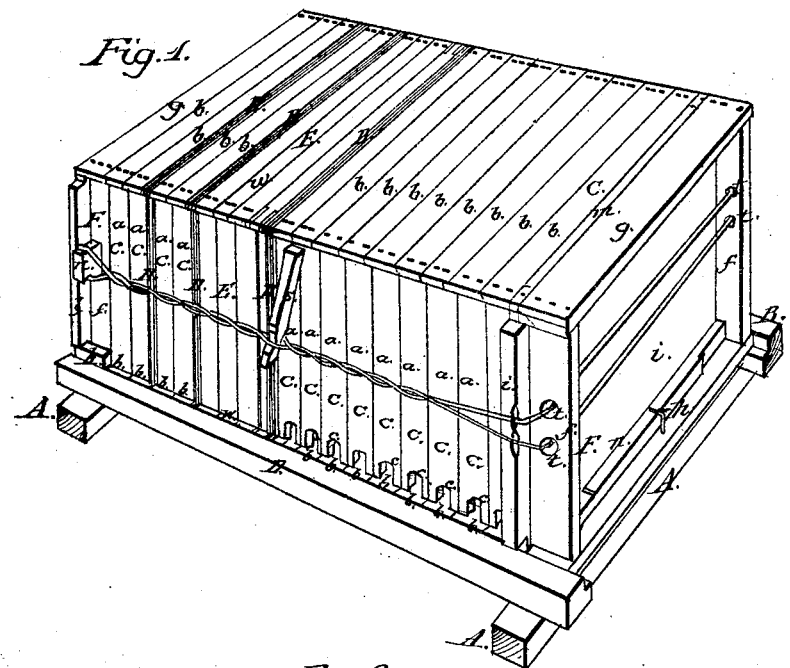
Figure 2:
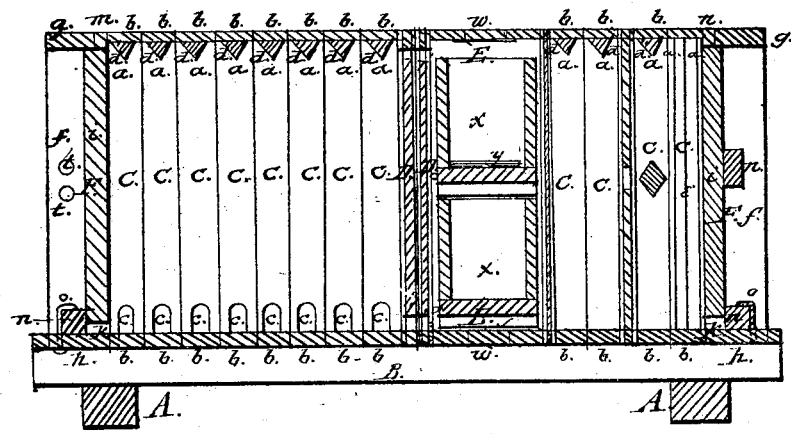

Figure 1 is a perspective view of the hive without honey-boxes;

Figure 2, a side elevation, in section, of the same;

Figure 3, a side elevation, in section, of a cap to be placed over the hive;

Figure 4 is a perspective view of the dividing-board;

Figure 5, a perspective view of the comb-guide;

Figure 6, a perspective view of the ventilator, in which the feed-boxes are placed;

Figure 7, a perspective view of the float in the feed-boxes; and

Figure 8, a perspective view of the feed-box.

A A represent two cross-pieces, to which are connected the ribbed pieces or bars B B, forming a support for the bee-hive.

The bars B B may be attached to any other suitable support, and are designed to keep the several parts of the hive in proper position. An additional bar may be nailed diagonally across the bars B B, to keep the frame square.

The hive proper consists of a series of frames, C C, dividing-boards, D D, comb-guides, $D'$ $D'$, ventilators, E E, and end pieces F F, placed on the bars B B, and fastened together by cords, as will be hereinafter described.

The frames C C are formed of two vertical pieces, $a$ $a$, and two projecting top and bottom pieces, $b$ $b$, and triangular bars $d$ $d$, placed point downward, on the under side of the top piece, and may have bee-passages $c$ $c$, through which the bees enter into the hive.

These frames may also have intermediate bars, $e$ $e$, placed either horizontally or vertically, as the form and dimensions of the frames may require.

These bars $e$ $e$ are designed, when used, to support the combs and strengthen the frames, which may be of any shape desired, the vertical and top and bottom pieces being of equal width.

The end pieces F F are formed of the vertical side-bars $f$ $f$, top bar $g$, bottom bar $h$, and board $i$, leaving a passage, $k$, at the bottom, for the bees to pass to and from the hive, and another passage at the top, for the bees to pass from the hive to the honey-boxes, when placed at the top of the hive.

The passage at the top may be opened or closed by means of a removable bar, $m$, and it also serves as a means of ventilating the hive.

The removable and reversible bar $n$ is designed to regulate the bee-passage $k$, by opening or closing, or partially closing the same, as the ends of said bar are cut at different lengths, as shown in fig. 1.

One of the end pieces F F is provided with a bar, $r$, with projecting ends, for attaching the cord to, that binds the hive together, said cord being tightened or loosened by twisting-pins $s$ $s$.

The other end piece, F, has holes $t$ $t$, through which the said cord is passed, in connecting the hive and its several parts together.

The ventilator E consists of a frame, with screens $v$ $v$ on the inner side of the top and bottom boards of the frame, which secures thorough ventilation of the hive when the bees are confined therein.

Removable bars $w$ $w$ are placed over the screens $v$ $v$, when so desired.

These ventilator-frames also serve as a receptacle for one or more feed-boxes, $x$, which are divided by a partition, as shown in fig. 8, and when liquid feed is used, a float, $y$, is put in the feed-box.

The feed-boxes need not be divided, as above set forth, but may be without said partition, if so desired.

In the absence of the ventilator E, the feed-boxes $x$ $x$ may be placed within empty frames $c$ $c$, when feeding the bees.

The comb-guides $D'$ $D'$ may be placed at any part of the hive, and are provided with slots, as shown in fig. 5, forming passages through which the bees can pass from one part of the hive to the other. These comb-guides, which serve to secure the construction of straight combs of regular thickness within the frames, are of the same size as the frames C C; that is, in height and length, but not in thickness, and are provided with strips $a'$ $a'$ on both sides, around their edges, so that in moving said comb-guides, two or more of them may be placed together, without fear of crushing, or in anywise injuring any of the bees that may remain on their surfaces.

If desired to confine the bees to a certain part of the hive, then a dividing-board, D, made similar to the comb-guides, but without slots or passages, is placed at the proper point.

The dividing-boards D D, as well as the end pieces F F, are also provided with strips $a'\ a'$ around their edges, as described for the comb-guides.

The comb-guides and dividing-boards have removable bars, $b'\ b'$, at their upper and lower edges, for the purpose of allowing the bees to pass into honey-receptacles placed above the hive, and for securing ventilation, as circumstances may require. These bars may, however, be dispensed with, if desired.

When the hive is not placed under any cover, I provide a suitable cap, M, of simple construction, and having openings, to secure ventilation, over the same.

Having thus fully described my invention,

What I claim as new, and desire to secure by Letters Patent, is—

1. The frames C C, constructed as described, and united by the means shown, for the purpose of forming a bee-hive, substantially as set forth and described.

2. The dividing-boards D D, provided with a movable strip, $b'$, at the top, as and for the purposes set forth.

3. The ventilator E, constructed as described, with screens $v\ v$, and movable bars $w\ w$, and serving as a receptacle for the feed-boxes $x\ x$, substantially as herein set forth.

4. The combination of the end pieces F F, constructed as described, strip $m$, space $k$, and reversible block $n$, all substantially as and for the purposes herein set forth.

5. The comb-guides $D'\ D'$, constructed with removable piece $b$ at the top, and with openings, as described, as and for the purposes set forth.

6. Constructing a bee-hive of a series of movable frames, comb-guides, dividing-boards, ventilator, and end pieces, all arranged and secured substantially as herein set forth.

In testimony that I claim the foregoing, I have hereunto set my hand, this 3d day of September, 1868.

A. T. WRIGHT.

Witnesses:
C. C. BOWERS,
J. A. GRAVOTT.